(12) United States Patent
De Oliveira (10) Patent No.: US 8,575,561 B2
(45) Date of Patent: Nov. 5, 2013

(54) CAPACITIVE SPREADING READOUT BOARD

(75) Inventor: Rui De Oliveira, Arenthon (FR)

(73) Assignee: CERN-European Organization for Nuclear Research, Geneva (CH)

(*) Notice: Subject to any disclaimer, the term of this patent is extended or adjusted under 35 U.S.C. 154(b) by 0 days.

(21) Appl. No.: 13/504,544

(22) PCT Filed: Nov. 5, 2009

(86) PCT No.: PCT/EP2009/007945
§ 371 (c)(1),
(2), (4) Date: Jun. 27, 2012

(87) PCT Pub. No.: WO2011/054365
PCT Pub. Date: May 12, 2011

(65) Prior Publication Data
US 2012/0261585 A1    Oct. 18, 2012

(51) Int. Cl.
*H01J 47/00*    (2006.01)

(52) U.S. Cl.
USPC ............................................ 250/374

(58) Field of Classification Search
USPC ............................................ 250/374
See application file for complete search history.

(56) References Cited

U.S. PATENT DOCUMENTS

| 4,642,465 A | 2/1987 | Britten |
| 5,686,721 A | 11/1997 | Schmidt-Bocking |

FOREIGN PATENT DOCUMENTS

| JP | 03-108688 | 5/1991 |
| JP | 2008-243634 | 10/2008 |

OTHER PUBLICATIONS

Silva et al., "EDXRF imaging of Pb in glazed ceramics using a micropattern gas detector," 2009, Analytical and Bioanalytical Chemistry, vol. 395, pp. 2073-2080.*
Bellazzini et al., "MicroPattern gas detectors with pixel read-out," 2003, Nuclear Instruments and Methods in Physics Research A, vol. 513, pp. 231-238.*
European Patent Office, *International Search Report and Written Opinion of the International Searching Authority*—International Application No. PCT/EP2009/007945, dated Sep. 14, 2010 (12 pages).

* cited by examiner

*Primary Examiner* — Kiho Kim
(74) *Attorney, Agent, or Firm* — Sunstein Kann Murphy & Timbers LLP (57) ABSTRACT

A readout board for use in a micropattern gas detector comprises a plurality of detector pads arranged into a plurality of consecutive layers that are separated by dielectric spacer material. An electron cloud hitting the front side of the readout board will induce a charge on one of the detector pads of the uppermost layer. By capacitive coupling, the signal will propagate downwards through the consecutive layers until it reaches the bottom layer, from which the charges are read out and analyzed. The position of the impact can be determined by comparing the charges that have spread to neighboring readout pads. Since only the bottommost layer of the readout pads needs to be connected to readout electronics, incident particles can be localized at high precision despite the relatively large size of the readout pads in the bottom layer. The invention is effective both in a gas electron multiplier (GEM) and in a MicroMegas detector.

30 Claims, 3 Drawing Sheets

CAPACITIVE SPREADING READOUT BOARD

FIELD OF THE INVENTION

The present invention relates to a readout electrode assembly for an avalanche particle detector, in particular for a micropattern gas detector (MPGD).

BACKGROUND AND STATE OF THE ART

Particle detectors are devices to detect, track, and/or identify radiation or particles and find wide applications throughout particle physics, biology as well as medical technology.

Particle detectors exploiting the process of ionization and charge multiplication in gases have been in use with continued improvements ever since Rutherford first employed a gas-filled wire counter to study natural radioactivity more than a century ago. Techniques for designing detectors of increased physical size and/or enhanced spatial resolution and sensitivity continue to be an active field of research in the detector community today.

Gaseous detectors typically collect the electrons released by ionizing radiation and guide them to a region with a strong electric field, thereby initiating an electron avalanche. The avalanche is able to produce enough electrons to create a current or charge large enough to be collected on a readout device and analyzed by readout electronics. The collected electron charge may indicate the charge, energy, momentum, direction of travel and other attributes of the incident particles or radiation.

In most such detectors, the large amplification field necessary to initiate and support the electron avalanche comes from a thin wire at a positive high voltage potential. This same thin wire also collects the electrons from the avalanche and guides them towards the readout electronics. More recently, attention has focused on so-called MicroPattern Gas Detectors (MPDGs) such as the Micromesh Gaseous Structure Chamber (MicroMegas) and the Gas Electron Multiplier (GEM). By employing semiconductor fabrication techniques, large area tracking MPGDs can be mass-produced in an impressive variety of geometries while at the same time permitting small avalanche gaps, and hence rapid signal development, fast readout and high reliability.

In MPGDs, the electrons generated in the amplification process are typically collected on metallic readout pads or strips that are arranged in a predetermined pattern on a semiconductor substrate and electrically connected to fast readout electronics. The spatial resolution of the detector device has conventionally been limited by the size of the individual readout pads. Two neighboring avalanches that are sufficiently close to hit a common readout pad can no longer be spatially distinguished, and hence may be misinterpreted as a single event.

An obvious way to increase the spatial detector resolution is to use more and smaller readout pads. However, a larger number of readout pads requires a correspondingly larger number of readout channels and electronics and hence increases both detector cost and complexity. In fact, the number of readout channels that can be analyzed quickly with modern readout electronics places an important constraint on the size of the readout pads, and hence on the detector resolution. This is particularly true as modern detectors become increasingly larger in size in order to accommodate for higher particle energies, and hence require a correspondingly large number of readout channels in the first place.

In an attempt to enhance the spatial resolution of the readout device without the drawback of a corresponding increase in the number of the readout channels, M. S. Dixit and A. Rankin propose, in their research article "Simulating the Charge Dispersion Phenomena in Micro Pattern Gas Detectors with a Resistive Anode", NUCL. INSTR. METH. A 566 (2006) 281, a composite anode readout pad with a resistive foil bonded to a plurality of readout pads with an insulating layer of glue. The glue acts as a dielectric spacer separating the resistive foil from the readout pads. Any localized charge avalanche arriving at the resistive foil will be dispersed in a direction parallel to the detector surface, and will induce corresponding charges in the subjacent readout pads. The relative intensity of the signals collected at neighboring readout pads allows to infer the position at which the cascade hit the resistive foil.

Another readout electrode assembly in which the spatial resolution is enhanced by means of a resistive charge spreading pad capacitively coupled to a plurality of readout boards is described in International Patent Application PCT/EP2009/000995. Careful calibration of the readout pads and a suitable interpolation scheme allow to localize events at a spatial resolution which is no longer limited to the size of an individual readout pad.

A charge spreading between readout pads mediated through a resistive material may lead to an increase in detector resolution. However, since the dispersion of the charges in the resistive layer needs time, this results in an indesirable increase in detector dead times and a corresponding reduction in readout rates.

Overview of the Present Invention

It is hence an object of the present invention to provide a readout device for an avalanche particle detector that allows for an improved resolution and faster readout. This objective is achieved by a readout device with the features of independent claim 1. The dependent claims relate to preferred embodiments.

A readout device for an avalanche particle detector according to the present invention comprises a first detector layer being defined by a first plurality of detector pads, and a second detector layer extending above said first detector layer, said second detector layer being defined by a second plurality of detector pads and being spatially separated from said first detector layer and being capacitively coupled thereto. The number of detector pads in said second detector layer is larger than the number of detector pads in said first detector layer. Said detector pads of said first detector layer are each connected to a readout means, said readout means being adapted to at least approximately determine a charge distribution among the detector pads of said second detector layer from a measured charge distribution among the detector pads of said first detector layer.

The detector concept according to the present invention relies on capacitive charge spreading through the readout board. An electron cloud hitting the front side of the readout board will induce a charge distribution on a plurality of detector pads in the second (upper) detector layer. The detector pads of the second detector layer may be spatially separated from the detector pads of the first detector layer extending beneath the second detector layer, but capacitively coupled thereto. Hence, the signal will spread in a downward direction to said detector pads of said first detector layer, from which it can be read out and analyzed. The readout means are adapted to at least approximately determine the charge distribution among the detector pads of the upper detector layer from the charge distribution measured among the detector pads of the lower detector layer. This allows to localize the position of the electron cloud hitting the front side of the detector from the signals detected at the bottommost detector layer opposite to the front side of the detector.

Since the number of detector pads in said second detector layer is larger than the number of detector pads in said first detector layer, the position of the incident particles can be determined with high accuracy even though only a relatively small number of readout pads in said first detector layer (and hence a corresponding small number of readout channels and electronics) is required. This reduces the cost and overall complexity of the readout system, and will enable readout boards of enlarged physical size and enhanced spatial resolution. Since capacitive spreading is fast, readout rates are high and detector times are short.

The principles underlying the present invention can be praciticed in a large variety of different detector designs. According to the invention, said first and second plurality of detector pads can be of any suitable shape, size and material, and can be arranged in any spatial configuration as long as the above-mentioned criterion is met. Any configuration or ensemble of said first plurality of detector pads defines a first detector layer in the sense of the present invention, and any further configuration or ensemble of said second plurality of detector pads defines a second detector layer. Said first and second detector layers can be of any size or shape, and may be either plane or curved.

According to a preferred embodiment of the invention, said detector pads are positioned in said respective detector layers such that a first charge distribution induced in said detector pads of said detector layer by a charge located on a given detector pad of said second detector layer is different from a second charge distribution induced in said detector pads of said first detector layer by an identical charge located on any neighboring detector pad of said given detector pad in said second detector layer. According to this embodiment, the detector pads shall be adapted and positioned in said first and second detector layers such that the charge distribution induced in said detector pads of said first (lower) detector layer allows to unambiguously infer the charge distribution in the second (upper) detector layer. For this purpose, according to the invention, said detector pads are positioned in said respective detector layers such that a first charge distribution induced in said detector pads of said first detector layer by a test charge located on a given detector pad of said second detector layer is different from a second charge distribution induced in said detector pads of said first detector layer by the same test charge on any other detector pad of said second detector layer. As long as this condition is met, it is indeed possible to trace back the charge distribution in the second (upper) detector layer from the readout charge distribution of the first (lower) detector layer, even if the number of detector pads in the second detector layer is larger than the number of detector pads in the first detector layer, or, in other words, the geometrical resolution of the second detector layer is higher than that of the first detector layer.

According to a preferred embodiment, the above-mentioned "second charge distribution" differs from said "first charge distribution" in that the relative amount of charges induced on two detector pads of said first detector layer according to said first charge distribution is different from the relative amount of charges induced on the same two detector pads of said first detector layer according to said second distribution. By comparing the charges that have spread to neighboring detection pads, the position of the impact can be determined accurately at a precision which is not limited by the size of the first detector pads.

According to a further embodiment, said second charge distribution differs from said first charge distribution in that it induces charges on a different set of detector pads of said first detector layer.

Preferably, said detector pads may be positioned in said respective detector layers such that said first charge distribution induces a charge exceeding a predetermined detection threshold on a given detector pad of said first layer, while said second charge distribution does not induce a charge above said detection threshold on that same detector pad of said first layer. Determining whether or not the charge induced on said detector pad is above or below said threshold value hence allows to distinguish said first charge distribution from said second charge distribution.

In a preferred embodiment of the present invention, a first set of detector pads of said first detector layer that a given pad of said second detector layer overlaps with is different from the set of detector pads of said first detector layer that any neighboring detector pad of said given detector pad in said second detector layer overlaps with. Since neighboring detector pads of said first layer may differ in the degree of overlap with the detector pads of said second detector layer, the charge distributions induced in said detector pads of said first detector layer may differ correspondingly. This allows to infer the position of the impact by comparing the relative amount of charges on the readout pads of said first detector layer.

In the sense of this invention, a detector pad of said first detector layer and a detector pad of said second detector layer may be understood to overlap if their projections, for instance their orthogonal projections, onto a common plane along a direction normal to said detector layers intersect. The size of the intersection may be indicative of the degree of the overlap. The set of detector pads of said first detector layer that a given detector pad of said second detector layer overlaps with may be the ensemble of detector pads of said first detector layer that has a non-vanishing overlap with a given detector pad of said second detector layer, when projected onto a common plane. The amount of the overlap of a detector pad of said first detector layer with a detector pad of said second detector layer may determine the amount of the charges induced in said detector pad of said first detector layer by a charge located on said detector pad of said second detector layer.

According to a preferred embodiment, a ratio of an overlap of a detector pad of the second detector layer with a first and a second detector pad of said first detector layer, respectively, is different from a ratio of an overlap of any neighboring detector pad of said given detector pad in said second detector layer with said first and said second detector pad in said first detector layer, respectively.

Since the degree or proportion to which the neighboring detector pads of said second layer overlap with a given pair of detector pads of said first detector layer vary, the charge distributions induced in said detector pads of said first detector layer vary accordingly. Again, this allows to infer on which of the two detector pads of the second detector layer a charge is located.

According to a further embodiment of the present invention, said detector pads in said second detector layer are smaller than said detector pads in said first detector layer. Despite the relatively large size of the readout pads of said first detector layer, capacitive charge spreading allows to localize the event with enhanced precision. In particular, the spatial resolution of the readout device according to the present invention is not limited by the relatively large size of the detector pads in said first detector layer. By comparing the charges that have spread to neighboring detector pads, the readout device according to the present invention allows to localize the position of the impact with high precision by reading out only a relatively small number of large readout pads of said first detector layer instead of the larger number of small readout pads of said second detector layer.

According to a preferred embodiment, said detector pads in said second detector layer are three to six times smaller in surface area, preferably four to five times smaller in surface area than said detector pads in said first detector layer.

According to a further preferred embodiment, said detector pads are equidistantly spaced in said first detector layer and/or in said second detector layer.

Said first detector layer may be separated from said second detector layer by a first dielectric layer. The dielectric layer may serve to provide the capacitive coupling between neighboring detector pads. In a preferred embodiment, a thickness of said first dielectric layer is in a range of 10 µm to 500 µM.

In a further preferred embodiment, a size and/or an orientation of said detector pads and/or a thickness and/or a material of a first dielectric layer separating said first detector layer from said second detector layer are chosen such that a capacitance formed by a detector pad in said first detector layer and an overlapping detector pad formed in said second detector layer is in the range of 10 pFarad per $cm^2$ and 1 nFarad per $cm^2$.

According to a further embodiment, a size and/or an orientation of said detector pads and/or a thickness and/or a material of the first dielectric layer separating said first detector layer from said second detector layer are chosen such that a capacitance formed by a detector pad in said first detector layer and an overlapping detector pad formed in said second detector layer is at least five times larger, and preferably at least ten times larger, than a capacitance formed by said first detector pad and its neighboring detector pad in said first layer.

By choosing the capacitive coupling in a lateral direction sufficiently smaller than the capacitive coupling in the vertical direction, an undesirable spreading of the signal in the lateral plane, which might otherwise dilute the signal, can be avoided.

According to a preferred embodiment, a size and/or an orientation of said detector pads and/or a separation of neighboring detector pads within said first detector layer and/or within said second detector layer is chosen such that a capacitance formed by said neighboring detector pads is in the range of 2.5 fFarad to 250 fFarad.

The readout device according to the present invention is not limited to two detector layers, but may comprise any number of successive detector layers defined by corresponding pluralities of detector pads. The signal will then spread through the subsequent layers by means of capacitive coupling until it reaches the bottommost layer, from which the signal is read out and analyzed. The larger the number of subsequent detector layers, the less readout channels may be required, and the higher is the spatial resolution of the detector device.

The readout device according to a preferred embodiment further comprises a third detector layer extending above said second detector layer, said third detector layer being defined by a third plurality of detector pads and being spatially separated from said second detector layer, but capacitively coupled thereto, wherein the number of detector pads in said third detector layer is larger than the number of detector pads in said second detector layer.

Hence, charges may be spread by means of capacitive coupling from said third detector layer to said second detector layer in exactly the same way as described above for the second and first detector layers, respectively. Once charges have been induced on said detector pads of said second detector layer, they will in turn induce corresponding charges on said detector pads of said first detector layer in exactly the same way described with reference to the preceding embodiments. Once charges are induced on said detector pads of said first detector layer, they can be read out and analyzed by means of the readout electronics. Since the number of detector pads in the third detector layer is still larger than the number of detector pads in the second detector layer, the spatial resolution of the detector device can be further enhanced even though the number of readout pads (and hence readout channels and readout electronics) is conserved.

According to a preferred embodiment, said detector pads are positioned in said third detector layer such that a first charge distribution induced in said detector pads of said second detector layer by a charge located on a given detector pad of said third detector layer is different from a second charge distribution generated in said detector pads of said second detector layer by an identical charge located on any neighboring detector pad of said given detector pad in said third detector layer This allows to unambiguously determine the charge distribution in the third detector layer from the charge distribution in the second detector layer, which can in turn be determined from the charge distribution measured in the readout pads of the first detector layer.

According to a preferred embodiment, said second charge distribution may differ from said first charge distribution in that the relative amount of charges induced on two detector pads of said second detector layer according to said first charge distribution is different from the relative amount of charges induced on the same two detector pads of said second detector layer according to said second charge distribution.

In a preferred embodiment, a first set of detector pads of said second detector layer that a given detector pad of said third detector layer overlaps with is different from the set of detector pads of said second detector layer that any neighboring detector pad of said given detector pad in said third detector layer overlaps with. As described above, whether and to which extent a detector pad of said third detector layer and a detector pad of said second detector layer overlap with each other, when viewed along a direction normal to said second and third detector layers, may determine the degree of capacitive coupling between said pair of detector pads, which in turn determines the relative amount of charges spreading to neighboring detector pads.

According to a further embodiment, said detector pads in said third detector layer are smaller than said detector pads in said second detector layer.

According to a preferred embodiment, said detector pads in said third detector layer are three to six times smaller in surface area, preferably four to five times smaller in surface area than said detector pads in said second detector layer.

Since charges are subsequently induced in subsequent detector layers, the readout device according to the present invention allows for an increase in spatial resolution, or a decrease in the number of readout channels required, that scales exponentially in the number of detector layers. The ratio in surface area of detector pads of consecutive layers determines the basis for the exponential scaling.

According to a preferred embodiment, said third detector layer is separated from said second detector layer by a second dielectric layer. A thickness of said second dielectric layer may be in a range of 10 µm to 500 µm.

According to a preferred embodiment, said detector pads are equidistantly spaced in said third detector layer.

In a preferred embodiment, the readout device further comprises a resistive layer formed at an upper surface of said readout device, said resistive layer being separated from the uppermost detector layer by a third dielectric layer.

The resistive layer may serve to protect the readout device from sparks or discharges, while at the same time allowing a dispersion of charges induced by the arriving electrons in the lateral direction.

According to a preferred embodiment, a surface resistivity of said resistive layer for charge transport in a direction parallel to said upper surface of said readout device is in a range of 0,5 MOhms per square to 100 MOhms per square. A surface resistivity in this range efficiently protects against sparks. At the same time, it prevents the signal from spreading over a distance that would exceed one detector pad diameter in the subjacent detector layer, and might therefore reduce the spatial resolution of the detector device.

In a preferred embodiment of the present invention, said detector pads of said first detector layer, said second detector layer and said third detector layer are all embedded into a common holding structure formed of a dielectric. A common holding structure allows for a convenient and simplified manufacturing process.

In a further preferred embodiment, said detector pads of said first detector layer and/or said detector pads of said second detector layer and/or said detector pads of said third detector layer are formed of copper.

The present invention is also directed at an avalanche particle detector comprising a gas chamber and first, second and third electrodes placed in this order in said gas chamber, wherein said first electrode and said second electrode delimit a conversion gap for generation of electrons by incident particles, and wherein said second electrode and said third electrode delimit an amplification gap for multiplication of electrons in an avalanche process. The second electrode is perforated by holes, and the third electrode comprises a readout device with some or all of the features of the present invention as described above.

The second perforated electrode and the third (readout) electrode may be connected to polarization means for generation of a high electric field in the amplification gap. Electrons are generated in this gap and then drift towards the third electrode where they produce a final electron charge to be localized with the readout device according to the present invention. As described above, capacitive spreading of the electron charge through the subsequent detector layers allows to detect the position of the impact with enhanced precision while requiring only a very limited number of readout channels.

The present invention is further directed at an avalanche particle detector comprising a gas chamber and first and second electrodes placed in this order in said gas chamber. Said first electrode comprises an insulator having first and second metal coating layers on opposed surface sides thereof, and a plurality of holes extending through said first electrode. The detector further comprises polarization means coupled to said coating layers and adapted to raise said first coating layer to a first potential and to raise said second coating layer to a second potential higher than said first potential. Said second electrode comprises a readout device according to the present invention with some or all of the features discussed above.

According to this latter embodiment, electron multiplication may take place in a plurality of holes extending through a foil with metal coatings on both sides. The generated electrons may then drift to the readout device, which is not involved in the amplification process itself. Also, in this second detector design, the readout device according to the present invention allows to localize the event with enhanced spatial resolution and/or with a reduced number of readout pads.

DETAILED DESCRIPTION OF A PREFERRED EMBODIMENT

The features and numerous advantages of a capacitive spreading readout board according to the present invention can be best understood from a description of the accompanying drawings, in which.

Figure 1:
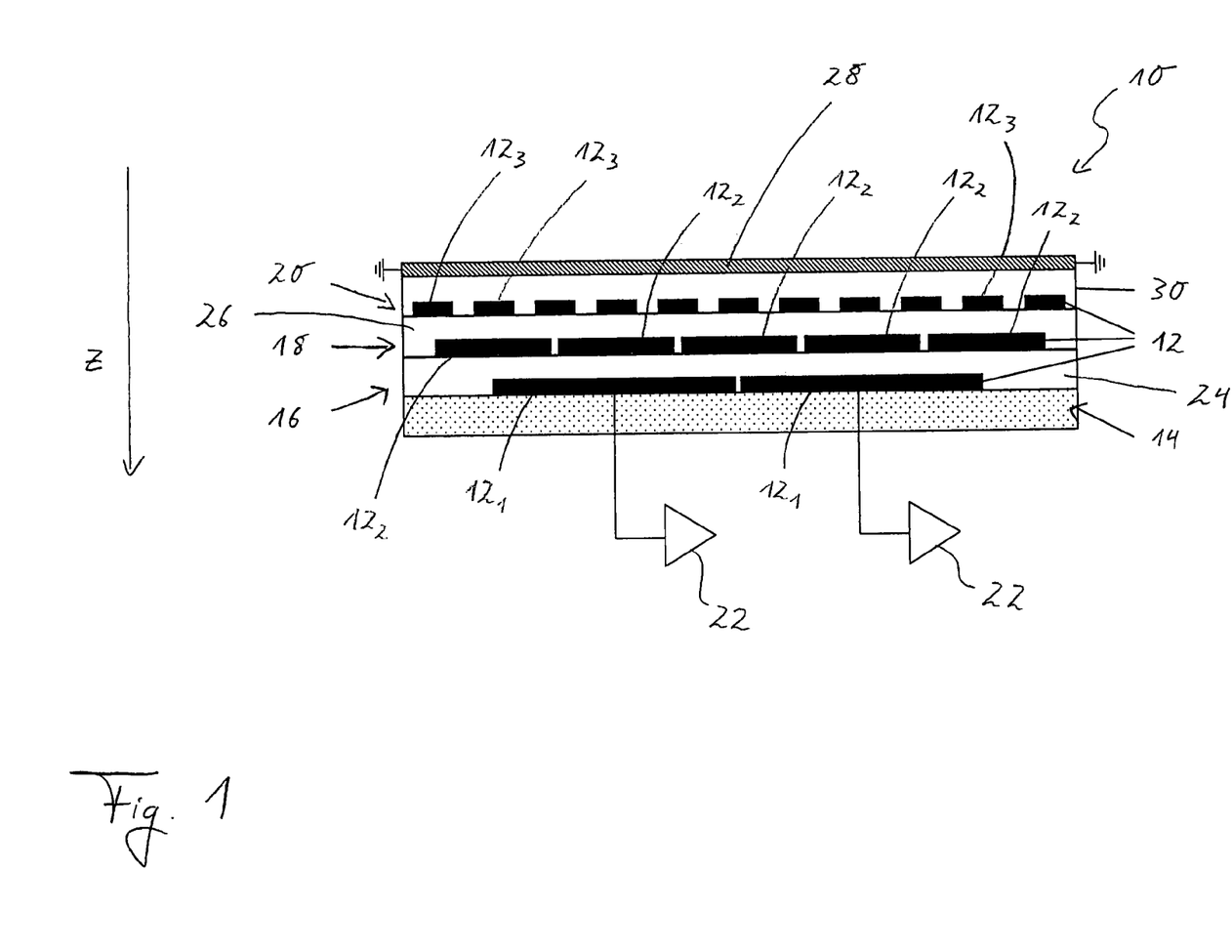
FIG. 1 is a schematic side view of a capacitive spreading readout board according to an embodiment of the present invention.

FIG. 1 is a side view of a part of a capacitive spreading readout board 10 according to the present invention. The readout board 10 shown in FIG. 1 comprises a plurality of detector pads 12 formed of copper and embedded into a common holding structure 14. The detector pads 12 are formed in said holding structure 14 to define (along a Z direction) three consecutive detector layers 16, 18, 20, each comprising a plurality of spatially separated detector pads 12. The detector pads $12_1$ forming the bottommost (first) detector layer 16 are smallest in number, but largest in size. They are formed of flat cuboids with a quadratic surface area and an edge length of approximately 2 mm and a thickness of approximately 10 μm. In the schematic drawing of FIG. 1, only two detector pads $12_1$ of the first detector layer 16 are shown. However, a capacitive spreading readout board 10 according to the present invention may comprise any number of detector pads $12_1$ in the first detector layer 16. Each of the detector pads $12_1$ of the first detector layer 16 are connected to individual readout means 22, which are in turn connected to readout electronics (not shown) for analysis of the signals triggered by incident particles or radiation.

The detector pads $12_2$ forming the second detector layer 18 extend above the detector pads $12_1$ of the first detector layer 16, and are separated from the first detector layer 16 by a first dielectric layer 24 formed of Prepreg, a glass epoxy, at a thickness of approximately 75 μm and having a dielectric constant $\epsilon$ in the range of 3.5 to 4.5. The detector pads $12_2$ of the second detector layer are again formed of copper and are cuboid in shape with a quadratic surface area and an edge length of approximately 1 mm and a thickness of approximately 10 μm. The schematic drawing of FIG. 1 shows five detector pads $12_2$ in the second detector layer 18, but it is to be understood that a readout board 10 according to the present invention may comprise any number of detector pads $12_2$ in the second detector layer 18.

The detector pads $12_3$ extend above the second detector layer 18 and define the third detector layer 20, which is separated from the second detector layer 18 by a second dielectric layer 26. The detector pads $12_3$ of the third detector layer are formed of copper and are cuboid in shape with a quadratic surface area and an edge length of approximately 0.5 mm and a thickness of approximately 10 μm. In the embodiment depicted in FIG. 1, the second dielectric layer 26 is identical in thickness and material to the first dielectric layer 24, but depending on the application it may also be advantageous to form the first dielectric layer 24 and the second dielectric layer 26 of different materials, and/or with different thicknesses.

In contrast to the detector pads $12_1$ of the first detector layer 16, neither the detector pads $12_2$ of the second detector layer 18 nor the detector pads $12_3$ of the third detector layer 20 are connected to readout means. Instead, they are electrically isolated in said dielectric holding structure 14.

The readout board 10 illustrated in FIG. 1 further comprises a resistive cover layer 28 formed at a top surface of the readout board 10 and separated from the third detector layer 20 by a third dielectric layer 30. In the embodiment of FIG. 1, the third dielectric layer 30 is identical in material and thickness to the first and second dielectric layers 24, 26. However, depending on the detector layout the third dielectric layer 30 may also be formed of a material, or size different from the material and size of the first and/or second dielectric layers 24, 26, respectively.

The inventors found that the material and dimensions of the resistive cover layer 28 may be adjusted such that its surface resistivity provides efficient protection of the readout board 10 against sparks and discharges while at the same time preventing horizontal spreading of the signal along the resistive cover layer 28 over a range that corresponds to more than one pad size in the underlying first detector layer 20.

The surface resistivity or sheet resistivity $R_S$ of a rectangular block of uniform material with a height h, a length l and a width w is generally given by p/h, where p is the specific resistance of the material. The total resistance R for charge transport along the length l of the substrate is then given in terms of the surface resistivity $R_S$ as $$R = R_S \cdot \frac{l}{w} = \frac{\rho}{h} \cdot \frac{l}{w}.$$

In the readout board according to the present embodiment, the resistive cover layer 28 has a quadratic surface area. Hence, l=w, and the resistance R for charge transport in a direction parallel to the upper surface of the readout board 10 therefore equals the sheet resistivity $R_S$, i.e. $R=R_S$. In order to better distinguish surface resistivity from total resistance, surface resistivity is usually measured in the units Ohm per square.

In the embodiment illustrated in FIG. 1, the resistive cover layer 28 is formed from a high resistive polyimide at a thickness of approximately 25 µm and with a surface resistivity for charge transport along a direction parallel to the upper surface (perpendicular to the Z direction) of the readout board 10 in the range of 0.5 to 100 MOhms per square.

In the embodiment depicted in FIG. 1, the detector pads of a given layer are all identical in size, shape, and material, and are distributed within their given layer at a separation of roughly 50 µm between neighboring pads. However, it is one of the advantages of micropattern gas detectors that detector pads can be formed in a large variety of different shapes and configurations, including two-dimensional strips, hexagonal pads, radial segments, and other geometries, depending on the detector design and operating conditions. Examples of readout geometries are described in A. Bresson et al., "Two-Dimensional Readout of GEM Detectors", Nuclear Instruments and Methods in Physics Research A 425 (1999) 254-261, which is incorporated herein by reference.

Moreover, the detector pads 12 according to the embodiment of FIG. 1 are arranged in plane layers 16, 18, 20 formed at equal intervals in said holding structure 14. However, the present invention is not limited to plane layers. Depending on the detector geometry and operation, the detector pads 12 may also be arranged to form bended or curved layers. For instance, the detector pads 12 of subsequent layers may be distributed equidistantly on concentrical spherical shells. The resistive cover layer 28 may likewise be formed in any (plane or curved) shape.

Figure 2:
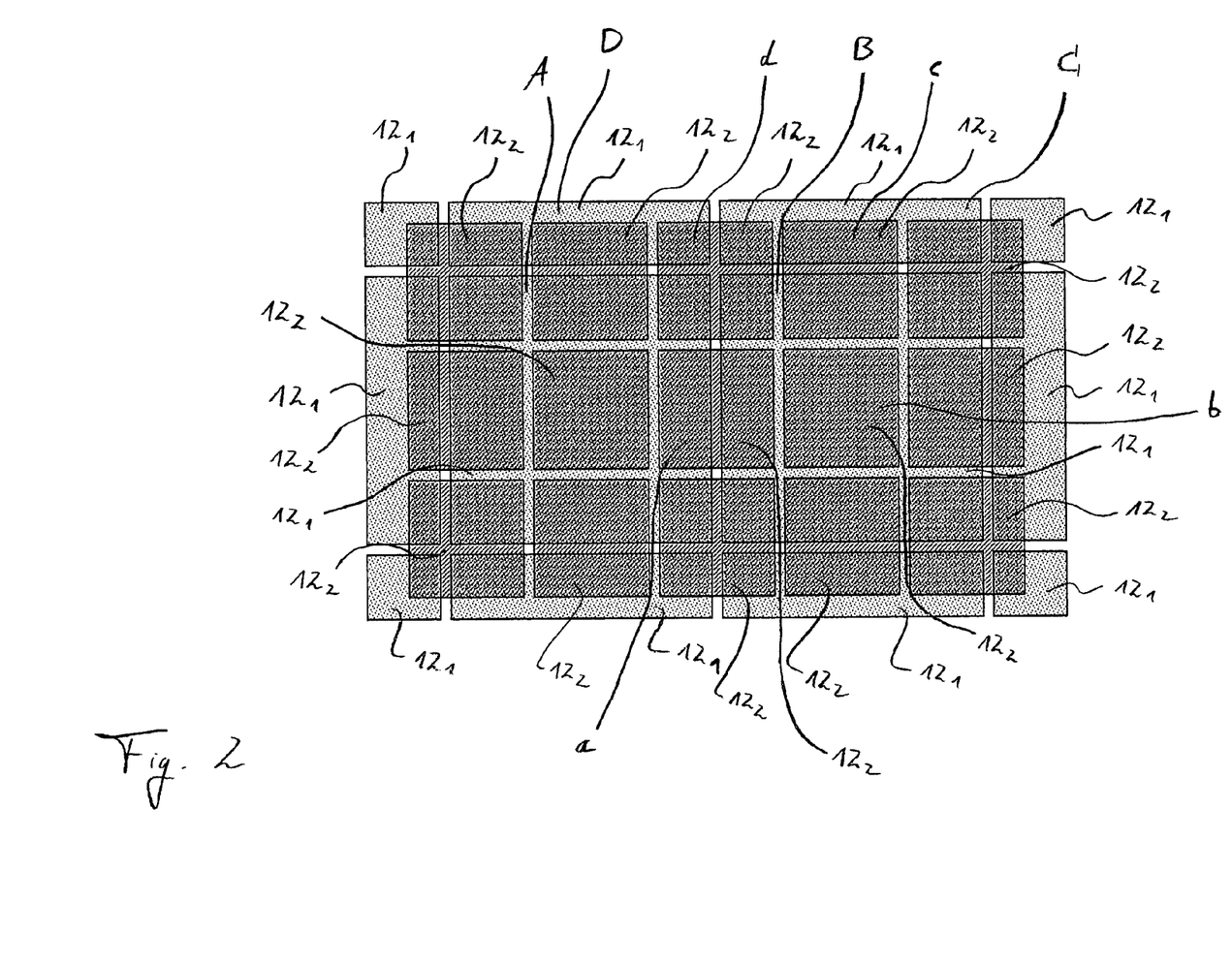
FIG. 2 is a schematic plan view of a capacitive spreading readout board according to an embodiment of the present invention.

The layout and configuration of the detector pads 12 as well as their relevance for the capacitive charge spreading will now be described in greater detail with reference to FIG. 2. FIG. 2 may be taken as a schematic plan view of the readout board 10 as illustrated in FIG. 1. However, for ease of presentation the simplified illustration of FIG. 2 shows only two adjacent detector layers, namely the first detector layer 16 and the second detector layer 18. The detector pads of the third detector layer 20 and the resistive cover layer 28 are not shown in FIG. 2 in order not to obscure the illustration. However, in the embodiment depicted in FIG. 1, the configuration of the detector pads $12_3$ of the third detector layer 20 with respect to the detector pads $12_2$ of the second detector layer 18 is the same (but for a rescaling of the detector pads) as the configuration of the detector pads $12_2$ of the second detector layer 18 with respect to the detector pads $12_1$ of the first detector layer 16. Hence, the plan view of FIG. 2 could equally well be taken to show the second detector layer 18 and third detector layer 20 instead of the first detector layer 16 and second detector layer 18, respectively.

In the plan view of FIG. 2, the detector pads $12_1$ of the first detector layer 16 are each represented by a large square (wherein the pads $12_1$ along the periphery are only partially drawn, since FIG. 2 is a cut-away view of the readout board 10), while the detector pads $12_2$ of the second detector layer 18 extending above the first detector layer 16 are represented by smaller squares. Each detector pad $12_2$ of said second detector layer 18 is positioned to overlap with a specific set of detector pads $12_1$ of said first detector layer 16, when viewed along the direction Z perpendicular to the common plane of the first detector layer 16 and second detector layer 18. For instance, the detector pad a in the center of the second detector layer 18 overlaps with the detector pads A and B of the first detector layer 16, while the detector pad b of the second detector layer 18, positioned to the immediate right of the detector pad a, overlaps with detector pad B of the first detector layer 16 only. Detector pad c of the second detector layer 18 overlaps with detector pads B and C of the first detector layer 16, while detector pad d of the second detector layer 18 overlaps with each of detector pads A, B, C and D of the first detector layer 16. The degree or proportion to which the respective detector pads overlap may also vary. For instance, detector pad a overlaps to equal proportions with A and B, while detector pad c overlaps with B and C such that approximately two thirds of the surface area of c lie above B and approximately one third of the surface areas of c lie above C.

As can be taken from the illustration of FIG. 2, the detector pads 12 are arranged in said first and second detector layers 16, 18 such that the set of detector pads $12_1$ of the first detector layer 16 that a given detector pads $12_2$ of the second detector layer 18 overlaps with is unique to each detector pad $12_2$. By means of capacitive coupling between the subsequent layers, electrical charges induced on the given detector pad $12_2$ of the second detector layer 18 will hence induce a charge distribution on the detector pads $12_1$ of the underlying first detector layer 16 that is unique to the detector pad $12_2$. For instance, a charge located on the detector pad a of the second detector layer 18 will induce approximately equal charges on detector pads A and B of the first detector layer 16, while a corresponding charge on detector pad b of the second detector layer 18 will, to a very good approximation, induce a charge on detector pad B of the first detector layer 16 only. Hence, the relative amount of charges induced on the detector pads $12_1$ of the first detector layer 16 allows to identify on which detector pad/pads of the second detector layer 18 charges were induced, and hence allows to locate the origin of the charge.

In a completely analogous way, a charge located on a given detector pad $12_3$ of the third detector layer 20 will induce a corresponding charge distribution on the detector pads $12_2$ of the second detector layer 18 that is unique to that detector pad $12_3$. Hence, the relative amount of charges induced on the detector pads $12_2$ of the second detector layer 18 allow to identify the detector pad $12_3$ of the third detector layer 20 from which the charge signal originated.

The direction and speed at which charges spread through the subsequent detector layers 16, 18, and 20 of the readout board 10 are determined by the capacitive coupling between neighboring detector pads, which is in turn governed by the geometry and size of the detector pads 12 as well as by the dielectric material separating neighboring pads. If the capacitive coupling between neighboring pads in the same detector layer is too high, the signal will propagate in a lateral direction (perpendicular to the Z direction) and will be diluted over much of the detector surface before reaching the bottommost layer. The signal level may then be too low for reliable signal detection. Hence, the parasitic capacitance in the lateral direction limits the number of subsequent detector layers over which a signal may reliably spread. The inventors found that signals can be reliably localized over three or even four subsequent detector layers if a size and/or an orientation of the detector pads and/or a thickness and/or a material of the dielectric layer separating two adjacent detector layers are chosen such that a capacitance formed by a detector pad in said first layer and an overlapping detector pad formed in said second layer is at least five times larger, and preferably at least ten times larger, than a capacitance formed by neighboring detector pads within the same detector layer.

In the embodiment depicted in FIGS. 1 and 2, a size and/or an orientation of the detector pads 12 are chosen such that a capacitance formed by neighboring detector pads in one and the same layer is in a range of 5 fFarad to 250 fFarad, while a capacitance between overlapping detector pads in adjacent layers is in the range of 10 pFarad per cm$^2$ to 1 nFarad per cm$^2$.

Next, the operation of the readout board 10 for the detection of particles or radiation will be described in further detail.

An incident particle penetrating the particle detector will generate an electron cloud hitting the resistive cover layer 28 of the grounded readout board 10. As explained above, the readout board 28 serves to protect the readout board 10 from sparks and discharges and disperses the electron charge over part of the detector surface. A high surface resistivity in the range of 30 MOhms per square to 100 MOhms per square efficiently prevents lateral spreading of the signal over an area larger than the surface of one pad in the uppermost detector layer, which would reduce the spatial resolution.

By means of capacitive coupling mediated through the third dielectric layer 30, charges are induced on the detector pad $12_3$ that corresponds in position to the location at which the electron cloud hit the resistive cover layer 28. As described above with respect to FIGS. 1 and 2, the charge induced on this detector pad $12_3$ itself induces charges on the detector pads $12_2$ of the underlying second detector layer 18 by means of capacitive coupling via the second dielectric layer 28, which in turn induce further charges on the detector pads $12_1$ of the first detector layer 16 by means of capacitive coupling via the first dielectric layer 24. Hence, charge signals are spread downwardly (along the Z direction) through the detector body. The charges induced on the detector pads $12_1$ of the first detector layer 16 are then read out and analyzed by means of the readout means 22.

As described above, the relative amount of charges detected on the detector pads $12_1$ of the first detector layer 16 allows to infer which of the detector pads $12_3$ of the third detector layer 20 was initially triggered, and may hence permit to determine the position of the electron cloud with great accuracy by comparing the charges that have spread to neighboring readout pads. In particular, the position of the electron cloud can be determined at an accuracy that corresponds roughly to the size of one of the small detector pads $12_3$ of the uppermost layer 20, even though only the significantly larger detector pads $12_1$ of the first detector layer 16 are readout and analyzed.

As a result, the invention provides a high resolution readout board with a reduced number of readout channels. The increase in detector resolution, or the decrease in the number of readout channels depends on the number of different detector layers and on the relative size of the readout pads in subsequent layers. The readout board 10 according to the present embodiment has three subsequent layers 16, 18, 20 of detector pads. A detector pad $12_2$ of the second detector layer 18 has a surface size that is approximately four times the surface size of a detector pad $12_3$ of the third detector layer 20, and the same relation holds for the detector pads $12_1$ and $12_2$ of the first and second detector layers 16 and 18, respectively. Hence, the readout board 10 according to the present embodiment allows for an increase in surface resolution, or a decrease in the number of readout channels by a factor of $4^2$. More generally, a readout board 10 with n subsequent detector layers and a surface ratio r between the surface size of detector pads of two subsequent layers allows for an increase in spatial resolution, or a decrease in the number of readout channels by a factor of approximately $r^{n-1}$.

The operation of a readout board 10 according to the present invention will now be illustrated in further detail by way of example for a gas electron multiplier detector (GEM) such as the one known from U.S. Pat. No. 6,011,265, on which FIG. 3 is based.

Figure 3:
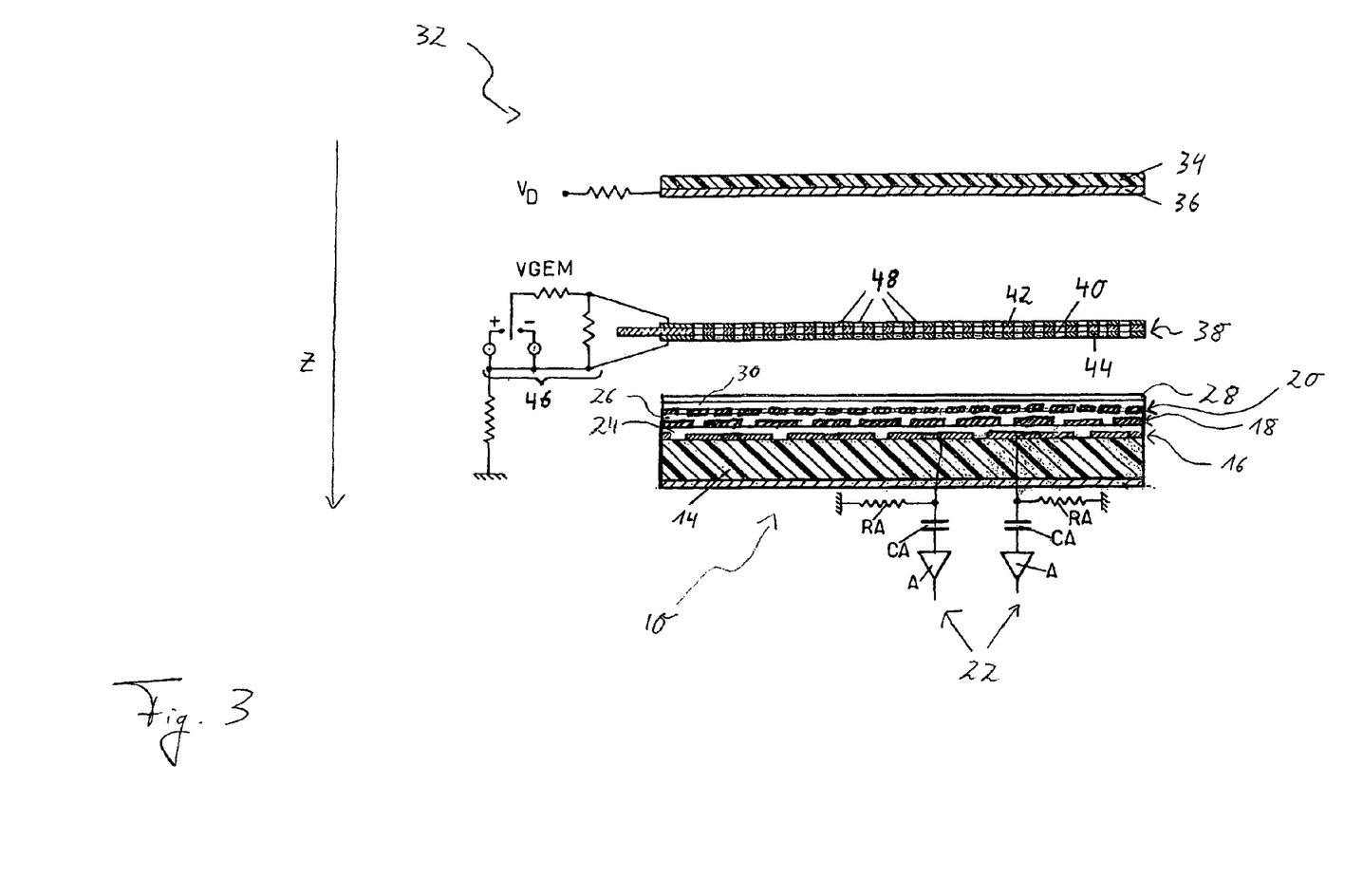
FIG. 3 is a schematic side view illustrating the operation of a capacitive spreading readout board according to the present invention in a gas electron multiplier detector.

The GEM detector 32 depicted in FIG. 3 comprises a gas chamber (not shown, otherwise referred to herein as a gas enclosure) provided with means for circulating an appropriate gas, for example a mixture or of argon and methane. The detector 32 further comprises an inlet window 34, through which ionizing particles or radiation may enter the gas enclosure, as well as three plane electrodes 36, 38 and 10 placed in this order in the gas enclosure parallel to one another. The upper electrode 36 serves as a drift electrode and is raised to a drift potential $V_D$. The lower electrode 10 comprises a readout board according to the present invention including first, second and third detector layers 16, 18, 20 embedded into a common holding structure 14, as described above with reference to FIGS. 1 and 2.

The intermediate electrode 38 is a so-called GEM electrode and comprises an insulator foil 40 sandwiched between a first metal coating layer 42 and a second metal coating layer 44. Polarization means 46 are coupled to the first metal coating layer 42 and the second metal coating layer 44 to apply a high potential VGEM therebetween, and small cylindrical holes 48 are formed at regular intervals in the GEM electrodes 38 to extend through the first metal coating layer 42, insulator foil 40, and second metal coating layer 44.

When an ionizing particle passes through the gas chamber, it ionizes the gas located in the drift zone between the drift electrode 36 and the GEM electrode 38 and typically creates about ten primary electrons in that gap. Those electrons are then drawn towards the GEM electrode 38 by the drift field extending between the drift electrode 36 and the GEM electrode 38. The voltage $V_D$ applied to the drift electrode 36 and the voltage VGEM applied to the metal coating layers 42, 44 are selected such that the electric field generated inside the cylindrical holes 48 is much stronger, for example more than 20-50 times stronger, than the electric field in the drift space. Due to this large field gradient, the primary electrons approaching the GEM electrode 38 are drawn into the cylindrical holes 48 and accelerated to sufficiently large speeds to induce an avalanche multiplication within the cylindrical holes 48.

The positive ions created by the impact ionization process are drawn towards the drift electrode 36, while the electron cloud is accelerated in the opposite direction and towards the readout board 10 until it hits the resistive cover layer 28. As described above, the electron cloud will then induce a charge on one of the detector pads $12_3$ of the third (uppermost) detector layer 20. By means of capacitive coupling, the signal will spread via the second detector layer 18 to the first detector layer 16, from which it will be read out and analyzed to infer the attributes of the incident particles. The readout means 22 connected to the detector pads $12_1$ of the first detector layer 16 comprise both fast amplifiers A that amplify the electric signals collected by the readout board 10, and processing means (not shown) for processing the signals supplied by the fast amplifiers A. For ease of presentation, only two readout means 22 are shown in the illustration of FIG. 3. However, it is to be understood that each of the detector pads $12_1$ of the first detector layer 16 is connected to a corresponding readout and processing means. As explained above, the position of the impact of the electrode cloud can be determined by comparing the charges that have spread to neighboring readout pads $12_1$, and hence the incident particle can be localized at high precision despite the relative large size of the readout pads $12_1$.

The readout board 10 according to the present invention is by no means limited to the GEM detector described above with reference to FIG. 3 above, but may be applied to the same effect in a variety of other particle detectors, in particular micropattern gaseous detectors. For instance, the readout board 10 according to the present invention may also serve as an anode of a MicroMegas detector such as the one described in U.S. Pat. No. 6,133,575, and will likewise permit the localization of incident particles at a higher precision or with a smaller number of readout channels.

The embodiments described above as well as the accompanying figures merely serve to illustrate the readout board and particle detectors according to the present invention, and should not be taken to indicate any limitation. The scope of the patent is solely determined by the following claims.

LIST OF REFERENCE SIGNS

| | |
|---|---|
| 10 | Readout board |
| 12 | Detector pads |
| $12_1$ | Detector pads of first detector layer 16 |
| $12_2$ | Detector pads of second detector layer 18 |
| $12_3$ | Detector pads of third detector layer 20 |
| 14 | Holding structure |
| 16 | First detector layer |
| 18 | Second detector layer |
| 20 | Third detector layer |
| 22 | Readout means |
| 24 | First dielectric layer |
| 26 | Second dielectric layer |
| 28 | Resistive cover layer |
| 30 | Third dielectric layer |
| 32 | GEM detector |
| 34 | Inlet window |
| 36 | Drift electrode |
| 38 | GEM electrode |
| 40 | Insulator foil |
| 42 | First metal coating layer |
| 44 | Second metal coating layer |
| 46 | GEM polarization means |
| 48 | Cylindrical holes |

The invention claimed is:

1. A readout device for an avalanche particle detector comprising:
a first detector layer being defined by a first plurality of detector pads; and
a second detector layer extending above said first detector layer, said second detector layer being defined by a second plurality of detector pads and being separated from said first detector layer, and being capacitively coupled to said detector pads of said first detector layer;
wherein the number of detector pads in said second detector layer is larger than the number of detector pads in said first detector layer; and
wherein said detector pads of said first detector layer are each connected to a readout means, said readout means being adapted to at least approximately determine a charge distribution among the detector pads of said second detector layer from a measured charge distribution among the detector pads of said first detector layer.

2. The readout device according to claim 1, wherein said detector pads are positioned in said respective detector layers such that a first charge distribution induced in said detector pads of said first detector layer by a charge located on a given detector pad of said second detector layer is different from a second charge distribution induced in said detector pads of said first detector layer by an identical charge located on any neighboring detector pad of said given detector pad in said second detector layer.

3. The readout device according to claim 2, wherein said second charge distribution differs from said first charge distribution in that the relative amount of charges induced on two detector pads of said first detector layer according to said first charge distribution is different from the relative amount of charges induced on the same two detector pads of said first detector layer according to said second charge distribution.

4. The readout device according to claim 2, wherein said second charge distribution differs from said first charge distribution in that it induces charges on a different set of detector pads of said first detector layer.

5. The readout device according to claim 1, wherein a first set of detector pads of said first detector layer that a given detector pad of said second detector layer overlaps with is different from the set of detector pads of said first detector layer that any neighboring detector pad of said given detector pad in said second detector layer overlaps with.

6. The readout device according to claim 1, wherein a ratio of an overlap of a detector pad of the second detector layer with a first and a second detector pad of said first detector layer, respectively, is different from a ratio of an overlap of any neighboring detector pad of said given detector pad in said second detector layer with said first and said second detector pad in said first detector layer, respectively.

7. The readout device according to claim 1, wherein said detector pads in said second detector layer are smaller than said detector pads in said first detector layer.

8. The readout device according to claim 7, wherein said detector pads in said second detector layer are 3 to 6 times smaller in surface area than said detector pads in said first detector layer.

9. The readout device of claim 7, wherein said detector pads in said second detector layer are 4 to 5 times smaller in surface area than said detector pads in said first detector layer.

10. The readout device according to claim 1, wherein said detector pads are equidistantly spaced in said first detector layer and/or in said second detector layer.

11. The readout device according to claim 1, wherein said first detector layer is separated from said second detector layer by a first dielectric layer.

12. The readout device according to claim 11, wherein a thickness of said first dielectric layer is in a range of 10 µm to 500 µm.

13. The readout device according to claim 1, wherein one or more of a size, an orientation of said detector pads, a thickness and a material of a first dielectric layer separating said first detector layer from said second detector layer are chosen such that a capacitance formed by a detector pad in said first detector layer and an overlapping detector pad formed in said second detector layer is in the range of 10 pFarad per cm$^2$ to 1 nFarad per cm$^2$.

14. The readout device according to claim 1, wherein one or more of a size, an orientation of said detector pads, a thickness and a material of a first dielectric layer separating said first detector layer from said second detector layer are chosen such that a capacitance formed by a detector pad in said first detector layer and an overlapping detector pad formed in said second detector layer is at least five times larger, and preferably at least ten times larger than a capacitance formed by said detector pad and its neighboring detector pad in said first layer.

15. The readout device according to claim 1, wherein one or more of a size, an orientation of said detector pads, and a separation of neighboring detector pads within one or both of said first detector layer and said second detector layer is chosen such that a capacitance formed by said neighboring detector pads is in the range of 2.5 fFarad to 250 fFarad.

16. The readout device according to claim 1, further comprising a third detector layer extending above said second detector layer, said third detector layer being defined by a third plurality of detector pads and being separated from said second detector layer, and being capacitively coupled to said detector pads of said second detector layer, wherein the number of detector pads in said third detector layer is larger than the number of detector pads in said second detector layer.

17. The readout device according to claim 16, wherein said detector pads are positioned in said third detector layer such that a first charge distribution induced in said detector pads of said second detector layer by a charge located on a given detector pad of said third detector layer is different from a second charge distribution generated in said detector pads of said second detector layer by an identical charge located on any neighboring detector pad of said given detector pad in said third detector layer.

18. The readout device according to claim 16, wherein a first set of detector pads of said second detector layer that a given detector pad of said third detector layer overlaps with is different from the set of detector pads of said second detector layer that any neighboring detector pad of said given detector pad in said third detector layer overlaps with.

19. The readout device according to claim 16, wherein said detector pads in said third detector layer are smaller than said detector pads in said second detector layer.

20. The readout device according to claim 19, wherein said detector pads in said third detector layer are 3 to 6 times smaller in surface area than said detector pads in said second detector layer.

21. The readout device of claim 19, wherein said detector pads in said third detector layer are 4 to 5 times smaller in surface area than said detector pads in said second detector layer.

22. The readout device according to claim 16, wherein said third detector layer is separated from said second detector layer by a second dielectric layer.

23. The readout device according to claim 22, wherein a thickness of said second dielectric layer is in a range of 10 µm to 500 µm.

24. The readout device according to claim 16, wherein said detector pads are equidistantly spaced in said third detector layer.

25. The readout device according to claim 1, further comprising a resistive layer formed at an upper surface of said readout device, said resistive layer being separated from the uppermost detector layer by a third dielectric layer.

26. The readout device according to claim 25, wherein a surface resistivity of said resistive layer for charge transport in a direction parallel to said upper surface of said readout device is in a range of 0.5 MOhms per square to 100 MOhms per square.

27. The readout device according to claim 1, wherein said detector pads of said first detector layer, said second detector layer and said third detector layer are embedded into a common holding structure formed of a dielectric.

28. The readout device according to claim 1, wherein at least one of said detector pads of said first detector layer and said detector pads of said second detector layer and said detector pads of said third detector layer are formed of copper.

29. An avalanche particle detector comprising;
a gas enclosure; and
first, second and third electrodes placed in this order in said gas enclosure;
said first electrode and said second electrode delimiting a conversion gap for generation of electrons by incident particles or radiation;
said second electrode and said third electrode delimiting an amplification gap for multiplication of electrons in an avalanche process;
wherein said second electrode is perforated by holes and said third electrode comprises a readout device according to claim 1.

30. An avalanche particle detector comprising:
a gas enclosure;
first and second electrodes placed in this order in said gas enclosure;
wherein said first electrode comprises an insulator having first and second metal coating layers on opposed surface sides thereof, and a plurality of holes extending through said first electrode;
polarization means coupled to said coating layers and adapted to raise said first coating layer to a first potential and to raise said second coating layer to a second potential higher than said first potential;
wherein said second electrode comprises a readout device according to claim 1.

* * * * *